United States Patent
Kuo

(10) Patent No.: US 8,503,345 B2
(45) Date of Patent: Aug. 6, 2013

(54) METHOD AND RELATED APPARATUS OF HANDLING POINT-TO-MULTIPOINT MBMS SERVICE IN A WIRELESS COMMUNICATIONS SYSTEM

(75) Inventor: Richard Lee-Chee Kuo, Taipei (TW)

(73) Assignee: Innovative Sonic Limited, Port Louis (MU)

( * ) Notice: Subject to any disclaimer, the term of this patent is extended or adjusted under 35 U.S.C. 154(b) by 1348 days.

(21) Appl. No.: 11/724,225

(22) Filed: Mar. 15, 2007

(65) Prior Publication Data
US 2007/0218930 A1 Sep. 20, 2007

Related U.S. Application Data

(60) Provisional application No. 60/743,508, filed on Mar. 16, 2006.

(51) Int. Cl.
*H04H 20/71* (2008.01)

(52) U.S. Cl.
USPC ........... 370/312; 370/313; 370/329; 370/345; 370/331

(58) Field of Classification Search
USPC ............. 455/414.1, 450, 522, 436, 447, 63.1, 455/502; 370/312, 313, 329, 345, 331
See application file for complete search history.

(56) References Cited

U.S. PATENT DOCUMENTS

| | | | |
|---|---|---|---|
| 2004/0103435 A1 | 5/2004 | Yi | |
| 2005/0111395 A1* | 5/2005 | Hwang et al. | 370/313 |
| 2006/0034205 A1 | 2/2006 | Kim | |
| 2006/0034225 A1* | 2/2006 | Jung et al. | 370/331 |
| 2006/0176838 A1* | 8/2006 | Lee et al. | 370/312 |
| 2009/0305712 A1* | 12/2009 | Franceschini et al. | 455/450 |

FOREIGN PATENT DOCUMENTS

| | | |
|---|---|---|
| KR | 10-2005-0020458 | 3/2005 |
| TW | I228005 | 2/2005 |
| TW | 200701678 | 1/2007 |
| WO | 2006131131 A1 | 12/2006 |

OTHER PUBLICATIONS

3GPP TS 23.246 V6.7.0 (Jun. 2005), Multimedia Broadcast/Multicast Service (MBMS); Architecture and functional description (Release 6).

(Continued)

*Primary Examiner* — Kathy Wang-Hurst
(74) *Attorney, Agent, or Firm* — Blue Capital Law Firm, P.C.

(57) ABSTRACT

A method of handling a point-to-multipoint (p-t-m) Multimedia Broadcast Multicast Service (MBMS) service in a wireless communications system includes the following step of receiving a message used for carrying information of the p-t-m MBMS service via a first channel when a radio resource control (RRC) state of the receiving terminal is a dedicated state. The message includes an instruction utilized to indicate the receiving terminal to release resources used for receiving the p-t-m MBMS service. Otherwise, the method includes the step of adding an instruction into a message used for carrying information of the p-t-m MBMS service when the message is transmitted to a receiving terminal via a dedicated channel. The instruction is utilized to indicate the receiving terminal to release resources used for receiving the p-t-m MBMS service.

12 Claims, 4 Drawing Sheets

OTHER PUBLICATIONS

3GPP TS 25.346 V6.7.0 (Dec. 2005), Introduction of the Multimedia Broadcast Multicast Service (MBMS) in the Radio Access Network (RAN); Stage 2 (Release 6).

3GPP TS 25.331 V6.8.0 (Dec. 2005), Radio Resource Control (RRC); Protocol Specification (Release 6).

3GPP: Technical Specification Group RAN; UTRAN Functions, Examples on Signalling Procedures (Release 6), 3GPP TR 25.931 v.6.1.0, Mar. 2005.

Samsung, General discussion on Mobility support for MBMS, 3GPP TSG-RAN WG3#40, Jan. 16, 2004, R3-040109.

Samsung, Introducing MBMS in RRC, draft CR, 3GPP TSG-RAN2 Meeting #44, Oct. 8, 2004, R2-041953.

Samsung: "MBMS scenario's and Uu signalling", 3GPP TSG-RAN2 Meeting #39, R2-032507, Nov. 17-21, 2003, pp. 1-8, XP050124795, San Diego, USA.

* cited by examiner

METHOD AND RELATED APPARATUS OF HANDLING POINT-TO-MULTIPOINT MBMS SERVICE IN A WIRELESS COMMUNICATIONS SYSTEM

CROSS REFERENCE TO RELATED APPLICATIONS

This application claims the benefit of U.S. Provisional Application No. 60/743,508, filed on Mar. 16, 2006 and entitled "Method and Apparatus to Release p-t-m MBMS service for UE CELL_DCH state in a Wireless Communications System", the contents of which are incorporated herein by reference.

BACKGROUND OF THE INVENTION

1. Field of the Invention

The present invention relates to a method and related communications device, and more particularly, to a method of handling a point-to-multipoint (p-t-m) Multimedia Broadcast Multicast Service (MBMS) service in a wireless communications system and related communications device that prevent unnecessary system resource waste and power consumption.

2. Description of the Prior Art

The third generation (3G) mobile telecommunications system has adopted a Wideband Code Division Multiple Access (WCDMA) wireless air interface access method for a cellular network. WCDMA provides high frequency spectrum utilization, universal coverage, and high quality, high-speed multimedia data transmission. The WCDMA method also meets all kinds of QoS requirements simultaneously, providing diverse, flexible, two-way transmission services and better communication quality to reduce transmission interruption rates. To enhance multimedia functions in the 3G mobile telecommunications system, a protocol specification developed by the 3rd Generation Partnership Project (3GPP) provides Multimedia Broadcast Multicast Service (MBMS). MBMS is a point-to-multipoint bearer service and is established on an existing network architecture of the Universal Mobile Telecommunications System (UMTS), utilizing Internet Protocol (IP) packets as a medium. Thus, MBMS allows a single source entity to transmit data to multiple user entities simultaneously.

Since the 3GPP has thoroughly defined operations and architecture of MBMS in the related specifications, the operations and architecture of MBMS are described only briefly hereinafter. For the universal mobile telecommunications system (UMTS), the 3G communications system comprises User Equipment (UE), the UMTS Terrestrial Radio Access Network (UTRAN), and the Core Network (CN). Communications protocols utilized include Access Stratum (AS) and Non-Access Stratum (NAS). AS comprises various sub-layers for different functions, including Radio Resource Control (RRC), Radio Link Control (RLC), Media Access Control (MAC), Packet Data Convergence Protocol (PDCP), and Broadcast/Multicast Control (BMC). The sub-layers mentioned, and their operating principles, are well known in the art, and detailed description thereof is omitted. For MBMS, the Core Network further comprises the Broadcast Multicast Service Center (BM-SC) that is not only a newly added network node but also an entry point for receiving external data, e.g. data provided by a content provider. The BM-SC manages provision, delivery, announcement, authorization, and storage of related parameters for MBMS services, and transmits corresponding information to the Gateway GPRS Support Node (GGSN). In the MBMS system architecture, the GGSN plays a role as an entry point for IP multicast traffic, and routes MBMS data to the Serving GPRS Support Node (SGSN) via a proper GPRS Tunnel (GTP). More than one SGSN can exist under the GGSN. The SGSN performs MBMS Bearer Service control functions to accurately transmit data packets to the UTRAN, allowing multiple UEs, which order the same MBMS service in the same UTRAN, to receive the same MBMS data. The SGSN can comprise more than one Radio Network Controller (RNC). The RNCs are responsible for efficiently allocating radio resources for the UEs according to the number of UEs counted by the Node-Bs (NB). The RNC comprises more than one NB that is responsible for transmitting or receiving radio waves to or from the UEs that can be mobile phones or PDAs.

According to the protocol specification developed by the 3GPP, MBMS offers two service modes: Broadcast mode and Multicast mode. When interested in a specific MBMS service, the UE needs to order the BM-SC for the MBMS service by establishing a service agreement including specific service provision phases. These two service modes have different service provision phases. The service provision phase of Broadcast mode includes Service announcement, Session Start, MBMS notification, Data Transfer and Session Stop. The service provision phase of Multicast mode includes Subscription, Service announcement, Joining, Session Start, MBMS notification, Data Transfer, Session Stop and Leaving. For realizing customized services, Joining and Leaving sessions utilized in Multicast mode enable the BM-SC to execute authorization and payment recording for the UEs at the Joining session. The service provision phases mentioned above are well known in the art, and will not be described in detail.

From the standpoint of the RRC, all logical data communication exchange channels, be they for providing data transmission exchange to the UE or for providing RRC layer control signal transmission exchange, are defined in the context of a Radio Bearer (RB). In the UE end, the RB comprises one unidirectional, or a pair of, uplink/downlink logic data transmission exchange channels. In the network end, the RB comprises one unidirectional, or a pair of, uplink/downlink logic data transmission exchange channels.

When providing the MBMS service, the UTRAN may obtain the number of the UEs ordering the MBMS service via a counting procedure, and can adopt either one of the following two transmission modes; point-to-point (p-t-p) transmission and point-to-multipoint (p-t-m) transmission. The UTRAN utilizes the p-t-m transmission to transfer data if selecting the Broadcast mode. On the contrary, if the Multicast mode is selected, the UTRAN utilizes either the p-t-p transmission or the p-t-m transmission to transfer data according to the number of the UEs. In the p-t-p transmission, transmission between the UEs and the UTRAN utilizes a dedicated-channel, and thereby the Node-B establishes one dedicated channel for one UE to transmit data and configuration. Compared with the p-t-p transmission, the p-t-m transmission allows the CN to provide the data and the configuration for multiple UEs in the same cell simultaneously.

In the protocol specification developed by the 3GPP, three logical channels are defined to transmit corresponding MBMS information: MBMS point-to-multipoint Control Channel (MCCH), MBMS point-to-multipoint Traffic Channel (MTCH), and MBMS point-to-multipoint Scheduling Channel (MSCH). MCCH is utilized to transmit a corresponding MBMS configuration, including MBMS Neighboring Cell Information, MBMS Radio Bearer Information, MBMS Service Information, and other information. MTCH is responsible for transferring service data to the UEs. MSCH is used for notifying the UEs with scheduling information of MBMS services. With MSCH, the UEs is allowed to execute reception only when data begins to be transferred, needless to keep on a receiving state during the whole service process. Furthermore, the three logical channels are mapped onto a transport channel, Forward Access Channel (FACH), and the FACH is mapped onto a physical channel, Secondary Common Control Physical Channel (S-CCPCH). In general, before obtaining the MBMS configuration, the UE first has to receive System Information block type 5 or 5bis through S-CCPCH, and detect whether an MCCH configuration carrying the above-mentioned information is included in the System Information block type 5 or 5bis.

According to the subclause 8.7.3 of the 3GPPTS 25.331 V6.8.0 RRC protocol specification, the UTRAN informs the UE with MBMS MODIFIED SERVICE INFORMATION message and other related control information through a Notification Procedure when a change applicable for one or more MBMS services the UE has joined. Additionally, different channels are used to transmit the above-mentioned information to the UE in accordance with a radio resource control(RRC) state of the UE. If the RRC state of the UE is CELL_DCH state, the UTRAN transmits MBMS MODIFIED SERVICE INFORMATION message via Dedicated Control Channel(DCCH). If the UE operates in other RRC states, such as URA_PCH, CELL_PCH, CELL_FACH state or Idle mode, MCCH is used to transmit MBMS MODIFIED SERVICE INFORMATION message. MBMS MODIFIED SERVICE INFORMATION message includes an information element (IE), "MBMS required UE action", which indicates an action the UE has to execute.

The IE "MBMS required UE action" may carry different context of instructions based on the channels. For example, when MCCH is selected to transmit MBMS MODIFIED SERVICE INFORMATION message, the IE "MBMS required UE action" includes six selections of instructions: "None", "Acquire counting info", "Acquire counting info-PTM RBs unmodified", "Acquire PTM RB info", "Request PTP RB", and "Release PTM RB." "Release PTM RB" indicates that the UE has to release a resource used for receiving an MBMS service as well as one or more radio bearers. Oppositely, when DCCH is selected, the IE "MBMS required UE action" includes three selections of instructions: "None", "Acquire PTM RB info" and "Request PTP RB". As can been seen as above, the instruction "Release PTM RB" is not a selection for the IE "MBMS required UE action" in the DCCH case. That is, the UTRAN has no way to require the UE operating in CELL_DCH state to release the corresponding radio bearer(s) for stopping reception of the p-t-m MBMS service. The UE may keep on reception even when the p-t-m MBMS service program finishes at Session Stop. In this situation, the UE wastes power and system resources in reception unable to be stopped.

SUMMARY OF THE INVENTION

It is therefore a primary object of the present invention to provide a method of handling a point-to-multipoint (p-t-m) Multimedia Broadcast Multicast Service (MBMS) service in a wireless communications system and related communications device, which prevent unnecessary system resource waste and power consumption.

The present invention discloses a method of handling a p-t-m MBMS service in a wireless communications system. The method includes the following step of adding an instruction into a message used for carrying information of the p-t-m MBMS service when the message is transmitted to a receiving terminal via a dedicated channel. The instruction is utilized to indicate the receiving terminal to release resources used for receiving the p-t-m MBMS service.

The present invention further discloses a communications device for accurately handling a p-t-m MBMS service in a wireless communications system. The communications device includes a control circuit, a processor and a memory. The control circuit is used for realizing functions of the communications device. The processor is installed in the control circuit and used for executing a program code to operate the control circuit. The memory is coupled to the processor and used for storing the program code. The program code includes: adding an instruction into a message used for carrying information of the p-t-m MBMS service when the message is transmitted to a receiving terminal via a dedicated channel. The instruction is utilized to indicate the receiving terminal to release resources used for receiving the p-t-m MBMS service.

The present invention further discloses a method of handling a p-t-m MBMS service in a receiving terminal of a wireless communications system. The method includes the following step of receiving a message used for carrying information of the p-t-m MBMS service via a first channel when a radio resource control (RRC) state of the receiving terminal is a dedicated state. The message includes an instruction utilized to indicate the receiving terminal to release resources used for receiving the p-t-m MBMS service.

The present invention further discloses a communications device for accurately handling a p-t-m MBMS service in a wireless communications system. The communications device includes a control circuit, a processor and a memory. The control circuit is used for realizing functions of the communications device. The processor is installed in the control circuit and used for executing a program code to operate the control circuit. The memory is coupled to the processor and used for storing the program code. The program code includes: receiving a message used for carrying information of the p-t-m MBMS service via a first channel when a radio resource control (RRC) state of the communications device is a dedicated state, the message comprising an instruction utilized to indicate the communications device to release resources used for receiving the p-t-m MBMS service. These and other objectives of the present invention will no doubt become obvious to those of ordinary skill in the art after reading the following detailed description of the preferred embodiment that is illustrated in the various figures and drawings.

DETAILED DESCRIPTION

Figure 1:
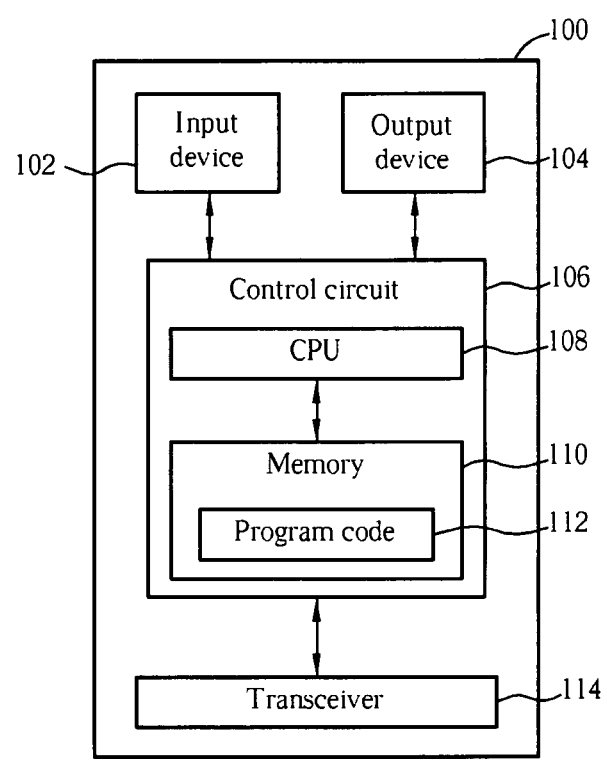
FIG. 1 is a functional block diagram of a communications device.

Please refer to FIG. 1, which is a functional block diagram of a communications device 100. For the sake of brevity, FIG. 1 only shows an input device 102, an output device 104, a control circuit 106, a central processing unit (CPU) 108, a memory 110, a program code 112, and a transceiver 114 of the communications device 100. In the communications device 100, the CPU 108 is installed in the control circuit 106, and the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3.

Figure 2:
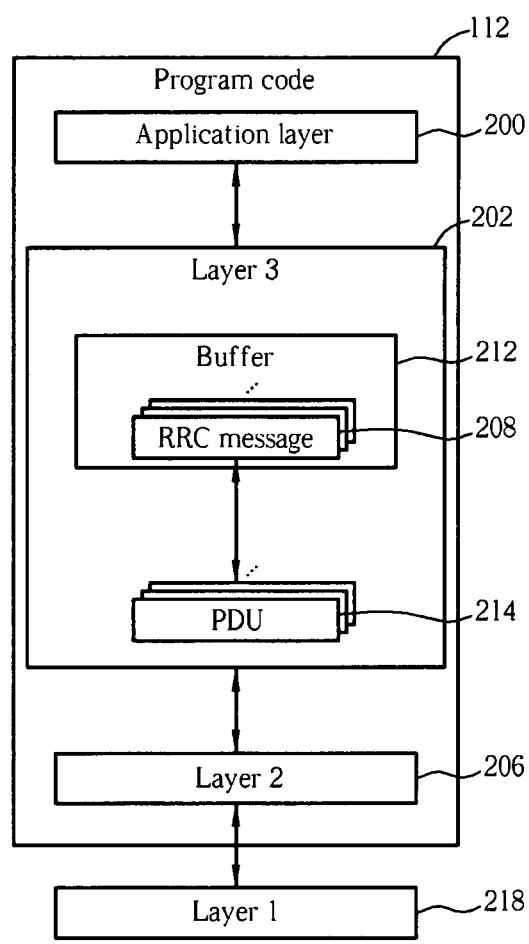
FIG. 2 is a diagram of program code in FIG. 1.

Please refer to FIG. 2, which is a diagram of the program code 112 shown in FIG. 1. The program code 112 includes an application layer 200, a Layer 3 202, and a Layer 2 206, and is coupled to a Layer 1 218. When the application layer 200 needs to transmit signals corresponding to the Layer 3 202, the Layer 3 202 generates multiple protocol data units (PDUs) 214 based on multiple radio resource control (RRC) messages 208 in a buffer 212. The Layer 2 206 assembles the PDUs 214 and further outputs the PDUs 214 to a predetermined destination through the Layer 1 218. On the contrary, when wireless signals are received via the Layer 1 218, the Layer 2 206 appropriately identifies and deconstructs the wireless signals, so as to generate the PDUs 214 for the Layer 3 202. The Layer 3 202 translates the PDUs 214 into the RRC messages 208 and then stores the RRC messages 208 in the buffer 212. Therefore, with the program code 112, the communications device 100 can establish, adjust or release the channels used for communicating with remote terminal.

Preferably, the communications device 100 is utilized in a third generation (3G) mobile telecommunications system and used for receiving p-t-m MBMS services and corresponding information thereof. The embodiment of the present invention configures corresponding algorithms in the program code 112 to accurately handle a p-t-m MBMS service to prevent waste of system resources and power consumption in the communications device 100.

Figure 3:
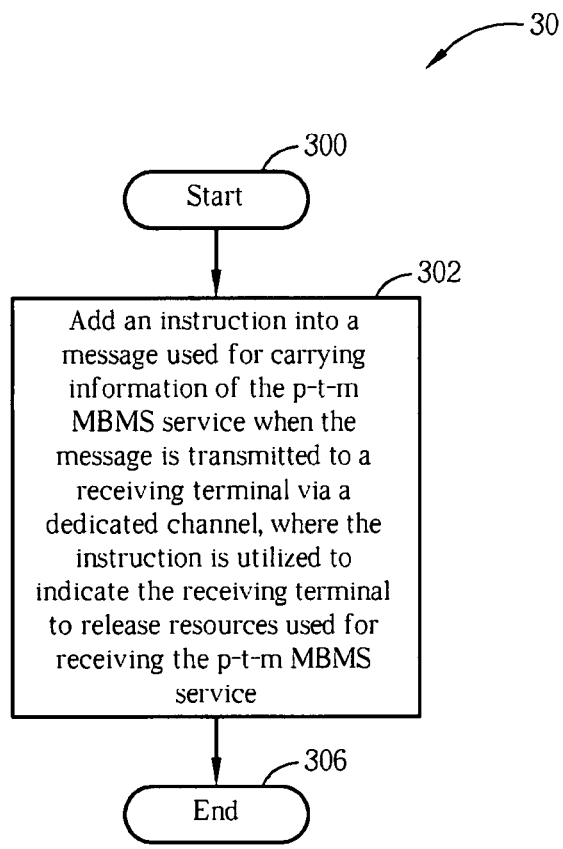
FIG. 3 is a flow chart of a method according to an embodiment of the present invention.

Please refer to FIG. 3, which is a flowchart of a process 30 according to an embodiment of the present invention. The process 30 is utilized to handle a p-t-m MBMS service in a wireless communications system. The process 30 includes the following steps:

Step 300: Start.
Step 302: Add an instruction into a message used for carrying information of the p-t-m MBMS service when the message is transmitted to a receiving terminal via a dedicated channel, where the instruction is utilized to indicate the receiving terminal to release resources used for receiving the p-t-m MBMS service.
Step 304: End.

According to the process 30, the receiving terminal consistently receives the message via the dedicated channel during the provision of the MBMS service, so as to maintain service quality. In order to make the stop of reception of the MBMS service possible for the receiving terminal, the instruction has to be added into the message. The receiving terminal can thus release the resources used for receiving the p-t-m MBMS service when receiving the instruction from the message. As a result, process 30 can prevent the situation that the receiving terminal is incapable of stopping the reception of the p-t-m MBMS service, resulting in resource waste and power consumption in the receiving terminal. In the 3G mobile telecommunications system, the receiving terminal is preferably an user equipment (UE), which operates in a radio resource control(RRC) state, CELL Dedicated Control Channel (CELL_DCH) state. Under this circumstance, the UE performs the above-mentioned Notification Procedure through Dedicated Control Channel (DCCH) during the provision of the MBMS service. MBMS MODIFIED SERVICE INFORMATION message transmitted in the Notification Procedure notifies the UE with control parameters or related operations that need to be done. According to the embodiment of the present invention, the UTRAN has to add an instruction, "Release PTM RB", into the information element (IE), "MBMS required UE action", which is included in MBMS MODIFIED SERVICE INFORMATION message. Thus, in a situation that the p-t-m MBMS service is deactivated or stopped, the UE can follow the operation required by the instruction, "Release PTM RB", to release one or more radio bearers used for receiving the p-t-m MBMS service. This enables reception of the p-t-m MBMS service to be stopped truly. Therefore, the process 30 adds the instruction, which is utilized to indicate to release the resources, into the message, allowing the receiving terminal operating via the dedicated channel to stop reception of the p-t-m MBMS service successfully.

Figure 4:
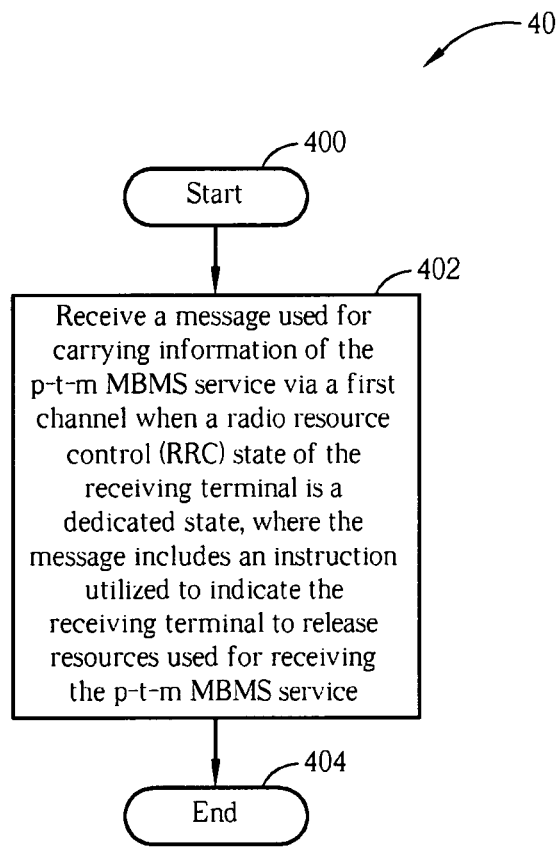
FIG. 4 is a flow chart of a method according to an embodiment of the present invention.

Please refer to FIG. 4, which is a flowchart of a process 40 according to another embodiment of the present invention. The process 40 is utilized to handle a p-t-m MBMS service in a receiving terminal of a wireless communications system. The process 40 includes the following steps:

Step 400: Start.
Step 402: Receive a message used for carrying information of the p-t-m MBMS service via a first channel when a radio resource control (RRC) state of the receiving terminal is a dedicated state, where the message includes an instruction utilized to indicate the receiving terminal to release resources used for receiving the p-t-m MBMS service.
Step 404: End.

According to the process 40, regarding the RRC state first, the receiving terminal operating in the dedicated state uses radio resources that allocated by the transmitting terminal and is not shared with other receiving terminals. The receiving terminal needs to receive the message via the first channel, whereas the message transmitted via the first channel is allowed to carry the instruction indicating that the receiving terminal needs to release resources used for receiving the p-t-m MBMS service. Thus, when the p-t-m MBMS service needs to be deactivated, the receiving terminal can release the resources to stop reception by following the operation required by the instruction in the message. For example, In the 3G mobile telecommunications system, the UTRAN transmits MBMS MODIFIED SERVICE INFORMATION message via MBMS point-to-multipoint Control Channel (MCCH). In this situation, the information element (IE), "MBMS required UE action", included in MBMS MODIFIED SERVICE INFORMATION message is allowed to adopt an instruction, "Release PTM RB". The instruction, "Release PTM RB", indicates that the UE has to release one or more radio bearers used for receiving the p-t-m MBMS service so that the UE is capable of stopping reception of the p-t-m MBMS service physically. Therefore, through the process 40, the receiving terminal can effectively stop receiving the p-t-m MBMS service and prevent unnecessary power consumption and the system resource waste.

In conclusion, according to the prior, for the receiving terminal receiving the p-t-m MBMS service in the dedicated RRC state, the message used for carrying information of the p-t-m MBMS service is transmitted through the dedicated channel. In this situation, the message is incapable of including any instructions that requires the receiving terminal to release the resources. Even in the end of the p-t-m MBMS service program (at Session Stop), the receiving terminal continues reception of the p-t-m MBMS service, resulting in unnecessary system resource waste and power consumption. On the contrary, the embodiments of the present invention provide two methods to solve the problem in the prior art. One method is adding the instruction, which indicates an operation of releasing the service resource, into the message transmitted in the dedicated channel. The other is receiving the message via the first channel allowing the message to include the instruction. With the above-mentioned methods, the receiving terminal can stop reception of the p-t-m MBMS service effectively. Therefore, the embodiments of the present invention prevents unnecessary system resource waste and power consumption in the receiving terminal.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling a point-to-multipoint (p-t-m) Multimedia Broadcast Multicast Service (MBMS) service in a receiving terminal of a wireless communications system, the method comprising:
    receiving a first message used for carrying information of the p-t-m MBMS service via an MBMS point-to-multipoint Control Channel (MCCH) when a radio resource control (RRC) state of the receiving terminal is CELL DCH and the receiving terminal is receiving a p-t-m MBMS service, the first message comprising an instruction utilized to indicate the receiving terminal to release resources used for receiving the p-t-m MBMS service; and
    receiving a second message used for carrying information of the p-t-m MBMS service via a Dedicated Control Channel (DCCH) when the RRC state of the receiving terminal is CELL DCH and the receiving terminal is not receiving any p-t-m MBMS service, the second message comprising an instruction utilized to indicate the receiving terminal to acquire resources used for receiving the p-t-m MBMS service.

2. The method of claim 1, wherein the resources used for receiving the p-t-m MBMS service comprise at least one radio bearer corresponding to the p-t-m MBMS service.

3. The method of claim 1, wherein the wireless communications system is a third generation telecommunications system.

4. The method of claim 3, wherein the radio resource control (RRC) state of the receiving terminal is CELL Dedicated Control Channel (CELL_DCH) state.

5. The method of claim 3, wherein the first message is MBMS MODIFIED SERVICE INFORMATION message.

6. The method of claim 5, wherein the instruction in the first message is IE "MBMS required UE action" set to "Release PTM RB".

7. A communications device for accurately handling a point-to-multipoint (p-t-m) Multimedia Broadcast Multicast Service (MBMS) service in a wireless communications system, the communications device comprising:
    a control circuit for realizing functions of the communications device;
    a processor installed in the control circuit, for executing a program code to operate the control circuit; and
    a memory coupled to the processor for storing the program code;
    wherein the program code comprises:
        receiving a first message used for carrying information of the p-t-m MBMS service via an MBMS point-to-multipoint Control Channel (MCCH) when a radio resource control (RRC) state of the communications device is CELL DCH and the communications device is receiving a p-t-m MBMS service, the first message comprising an instruction utilized to indicate the receiving terminal to release resources used for receiving the p-t-m MBMS service; and
        receiving a second message used for carrying information of the p-t-m MBMS service via a Dedicated Control Channel (DCCH) when the RRC state of the communications device is CELL DCH and the receiving terminal is not receiving any p-t-m MBMS service, the second message comprising an instruction utilized to indicate the receiving terminal to acquire resources used for receiving the p-t-m MBMS service.

8. The communications device of claim 7, wherein the resources used for receiving the p-t-m MBMS service comprise at least one radio bearer corresponding to the p-t-m MBMS service.

9. The communications device of claim 7, wherein the wireless communications system is a third generation telecommunications system.

10. The communications device of claim 9, wherein the radio resource control (RRC) state of the communications device is CELL Dedicated Control Channel (CELL_DCH) state.

11. The communications device of claim 9, wherein the first message is MBMS MODIFIED SERVICE INFORMATION message.

12. The communications device of claim 11, wherein the instruction in the first message is IE "MBMS required UE action" set to "Release PTM RB".

* * * * *